(12) United States Patent
Arellano et al.

(10) Patent No.: US 7,726,728 B2
(45) Date of Patent: Jun. 1, 2010

(54) HEADLINER HAVING A SUNROOF OPENING

(75) Inventors: Nora Arellano, Ann Arbor, MI (US);
Mohammed Alawadi, Plymouth, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 190 days.

(21) Appl. No.: 11/959,633

(22) Filed: Dec. 19, 2007

(65) Prior Publication Data

US 2009/0160221 A1    Jun. 25, 2009

(51) Int. Cl.
*B60J 7/00* (2006.01)
*B60R 13/02* (2006.01)

(52) U.S. Cl. .............. 296/214; 296/216.08; 296/216.07

(58) Field of Classification Search ................. 296/39.1, 296/214, 216.07, 216.08
See application file for complete search history.

(56) References Cited

U.S. PATENT DOCUMENTS

| | | | |
|---|---|---|---|
| 3,889,320 | A | 6/1975 | Koscik |
| 3,953,067 | A | 4/1976 | Isola |
| 4,180,957 | A | 1/1980 | Rantala |
| 4,783,116 | A | 11/1988 | Hough |
| 4,913,484 | A | 4/1990 | Dowd et al. |
| 5,195,793 | A | 3/1993 | Maki |
| 5,269,060 | A | 12/1993 | Dowd et al. |
| 5,503,903 | A | 4/1996 | Bainbridge et al. |
| 5,688,022 | A | 11/1997 | Adams et al. |
| 5,853,843 | A | 12/1998 | Patel et al. |
| 5,876,084 | A | 3/1999 | Smith et al. |
| 6,048,809 | A | 4/2000 | Brow et al. |
| 6,102,473 | A | 8/2000 | Steininger et al. |
| 6,120,090 | A | 9/2000 | Van Ert et al. |
| 6,204,209 | B1 | 3/2001 | Rozek et al. |
| 6,368,702 | B1 | 4/2002 | Erickson |
| 6,780,097 | B2 | 8/2004 | Shuttleworth et al. |
| 6,832,810 | B2 | 12/2004 | Byma et al. |

(Continued)

FOREIGN PATENT DOCUMENTS

DE    3839577    5/1990

(Continued)

*Primary Examiner*—Dennis H Pedder
(74) *Attorney, Agent, or Firm*—Gifford, Krass, Sprinkle, Anderson & Citkowski, P.C.

(57) ABSTRACT

A headliner assembly covers an inner surface of a motor vehicle roof having a sunroof opening. The headliner assembly includes a dimensionally stable substrate having a first edge extending along the sunroof opening. The substrate has an upper surface facing the inner surface of the motor vehicle roof. The substrate further has a bottom surface opposite the upper surface. A molded reinforcement is fixedly secured to the upper surface of the substrate. The reinforcement has a second edge extending along the sunroof opening. The second edge of the reinforcement has a contoured portion that extends further inwardly toward a center of the sunroof opening relative to the first edge of the substrate. A trim cover has a third edge extending along the sunroof opening. The trim cover is disposed along the bottom surface of the substrate and extends around the contoured portion of the reinforcement so that the third edge of the trim cover is disposed between the upper surface of the substrate and the inner surface of the motor vehicle roof.

16 Claims, 3 Drawing Sheets

U.S. PATENT DOCUMENTS

| | | |
|---|---|---|
| 6,887,552 B2 | 5/2005 | Dykman et al. |
| 6,890,023 B2 | 5/2005 | Preisler et al. |
| 6,939,491 B2 | 9/2005 | Brown et al. |
| 7,036,876 B2 * | 5/2006 | Senoo et al. ............... 296/214 |
| 7,165,371 B2 | 1/2007 | Yoyasu |
| 7,416,626 B2 * | 8/2008 | Dooley et al. ............... 156/204 |
| 2003/0124333 A1 | 7/2003 | Itaba |
| 2006/0261508 A1 | 11/2006 | Lustiger et al. |
| 2008/0258507 A1 * | 10/2008 | Dykman et al. ........ 296/216.07 |

FOREIGN PATENT DOCUMENTS

| | | |
|---|---|---|
| GB | 2215284 | 9/1989 |
| WO | WO-97/10950 | 3/1997 |
| WO | WO-2006091031 | 8/2006 |

* cited by examiner

_US 7,726,728 B2_

HEADLINER HAVING A SUNROOF OPENING

FIELD OF THE INVENTION

The invention relates to headliners for motor vehicles having sunroofs. More particularly, the invention relates to a molded reinforcement with a contoured portion about which a trim cover is wrapped to provide a dimensionally controlled edge along the sunroof opening.

BACKGROUND OF THE INVENTION

Motor vehicles commonly include sunroof openings formed in the roof. Motor vehicles also typically include a headliner for covering the inside surfaces of the roof. A headliner for vehicles with a sunroof will include an opening allowing access to the sunroof from inside of the vehicle. Several conventional methods are known for forming and finishing the peripheral edges defining the opening in the headliner. One method involves folding a substrate of the headliner and a liner or fabric together over themselves in order to conceal the unfinished peripheral edge of the substrate. Another involves forming the opening by water jet trimming the substrate and liner together, then wrapping an additional piece of liner around the unfinished edge resulting from the trimming. Yet another way involves installing a garnish along the unfinished edge. Each of these conventional methods of forming an edge of a sunroof opening in a headliner are known to present a number of issues in production, such as difficulty in providing a repeatable edge, undesired labor costs and/or undesired part cost.

As such, it remains desirable to provide an improved headliner design that allows repeatable formation of the edges defining the sunroof opening in the headliner.

SUMMARY OF THE INVENTION

According to another aspect of the invention, a headliner assembly is provided for covering an inner surface of a motor vehicle roof having a sunroof opening. The headliner assembly includes a dimensionally stable substrate having a first edge extending along the sunroof opening. The substrate has an upper surface facing the inner surface of the motor vehicle roof. The substrate further has a bottom surface opposite the upper surface. A molded reinforcement is fixedly secured to the upper surface of the substrate. The reinforcement has a second edge extending along the sunroof opening. The second edge of the reinforcement has a contoured portion that extends further inwardly toward a center of the sunroof opening relative to the first edge of the substrate. A trim cover has a third edge extending along the sunroof opening. The trim cover is disposed along the bottom surface of the substrate and extends around the contoured portion of the reinforcement so that the third edge of the trim cover is disposed between the upper surface of the substrate and the inner surface of the motor vehicle roof.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
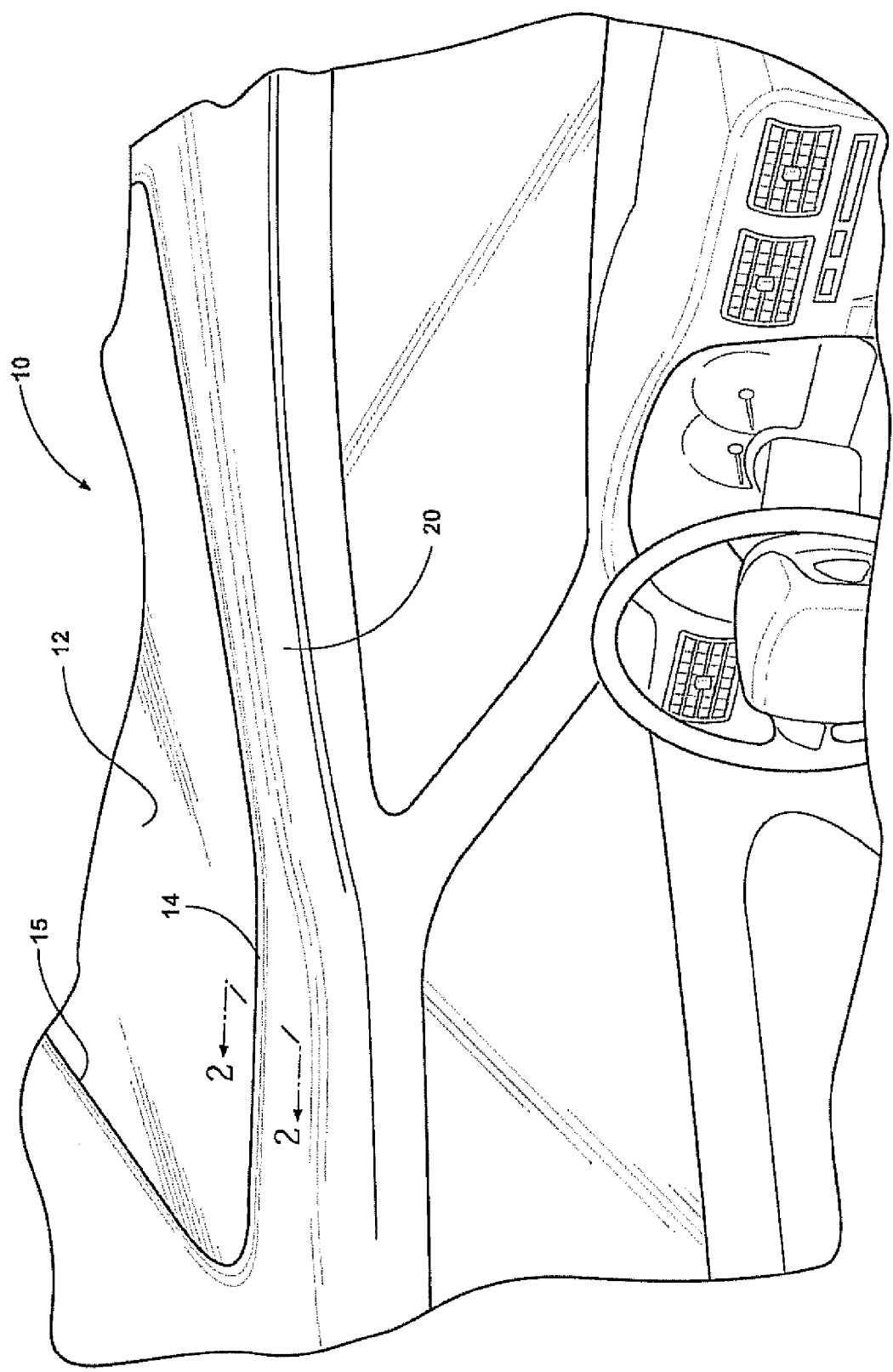
FIG. 1 is a partial perspective view of a roof of a vehicle as viewed from a passenger compartment of the vehicle.
Figure 2:
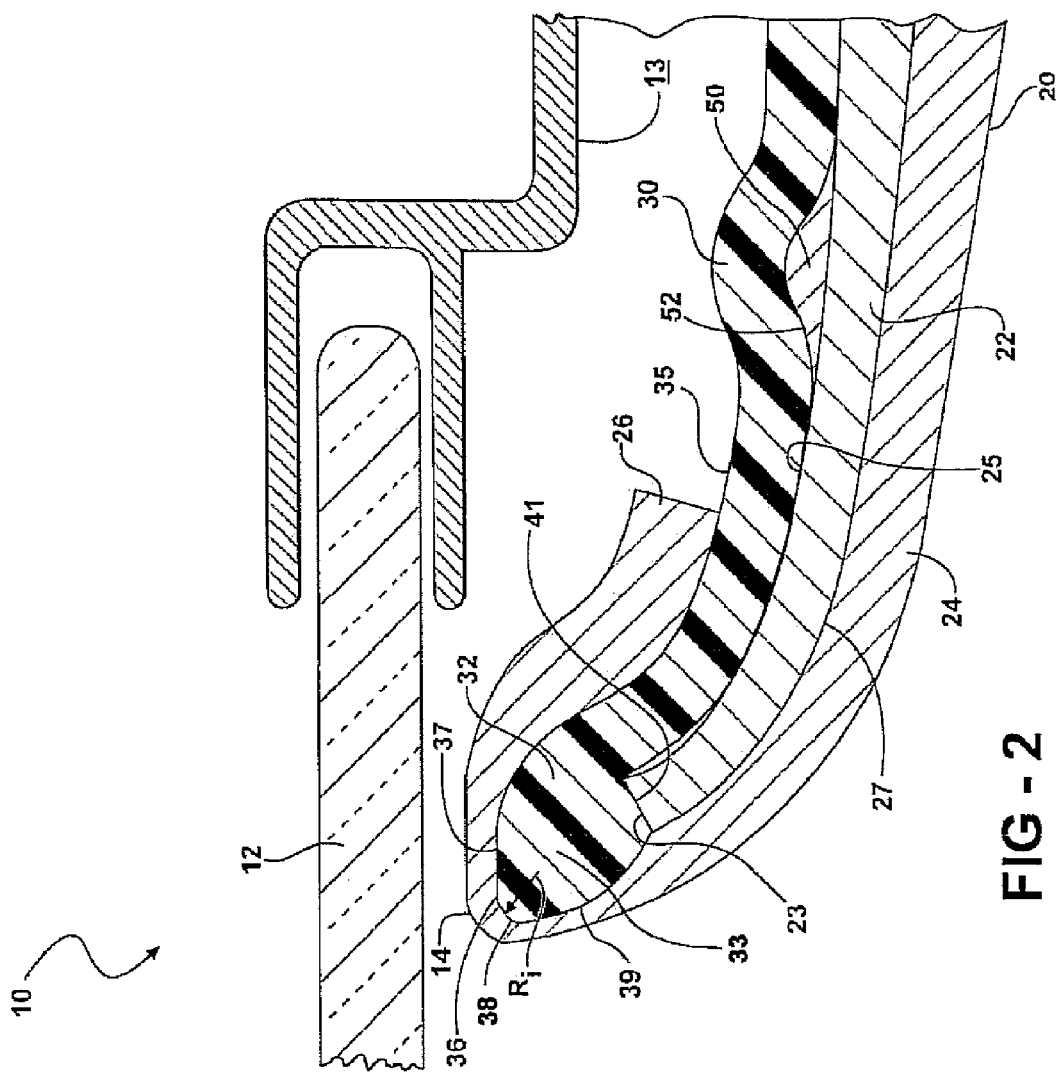
FIG. 2. is a cross sectional view of the roof of the vehicle.

Referring to FIGS. 1 and 2, a headliner assembly 20 is provided for covering an inner surface 13 of a motor vehicle roof 10. The headliner assembly 20 includes an opening 15 corresponding with a sunroof opening 12 in the roof 10. The headliner assembly 20 includes a dimensionally stable substrate 22 having a first edge 23 extending peripherally along the opening 15. The substrate 22 has an upper surface 25 facing the inner surface 13 of the motor vehicle roof 10. The substrate 22 further has a bottom surface 27 opposite the upper surface 25.

A molded reinforcement 30 is fixedly secured to the upper surface 25 of the substrate 22. The reinforcement 30 has a second edge 33 extending peripherally along the opening 15. As shown in FIG. 2, the second edge 33 of the reinforcement 30 has a contoured portion 32 that extends further inwardly toward a center of the sunroof opening 12 than the first edge 23 of the substrate 22.

A trim cover 24 has a third edge 26 extending peripherally along the opening 15. The trim cover 24 is disposed along the bottom surface 27 of the substrate 22 and extends around the contoured portion 32 of the reinforcement 30 so that the third edge 26 is secured to a top surface 35 of the reinforcement 30 and disposed between the upper surface 25 of the substrate 22 and the inner surface 13 of the motor vehicle roof 10. The trim cover 24 may be formed by bonding a textile sheet to a foam sheet to give the headliner assembly 20 a soft padded feel. In one embodiment, the trim cover 24 is approximately 3 mm thick.

The contoured portion 32 of the reinforcement 30 includes an outer surface 36 having a cross section defined by an upper trailing surface 37, a bottom trailing surface 39 and a leading surface 38 extending therebetween. The upper 37 and bottom 39 trailing surfaces extend at an acute angle from opposite respective upper and bottom ends of the leading surface 38. In one embodiment, the leading surface 38 is generally arcuately shaped and has a radius $R_l$ of approximately 3 mm to form an edge that extends along the perimeter of the opening 15 in the headliner assembly 10 and that appears consistently well-defined through the thickness of the trim cover 24. The trim cover 24 may be tensioned about the contoured portion 32 prior to securing the third edge 26 along the top surface 35 of the reinforcement 30, such that a section of the trim cover 24 is compressed to enhance the definition of the contoured portion 32 as viewed through the trim cover 24.

Figure 3:
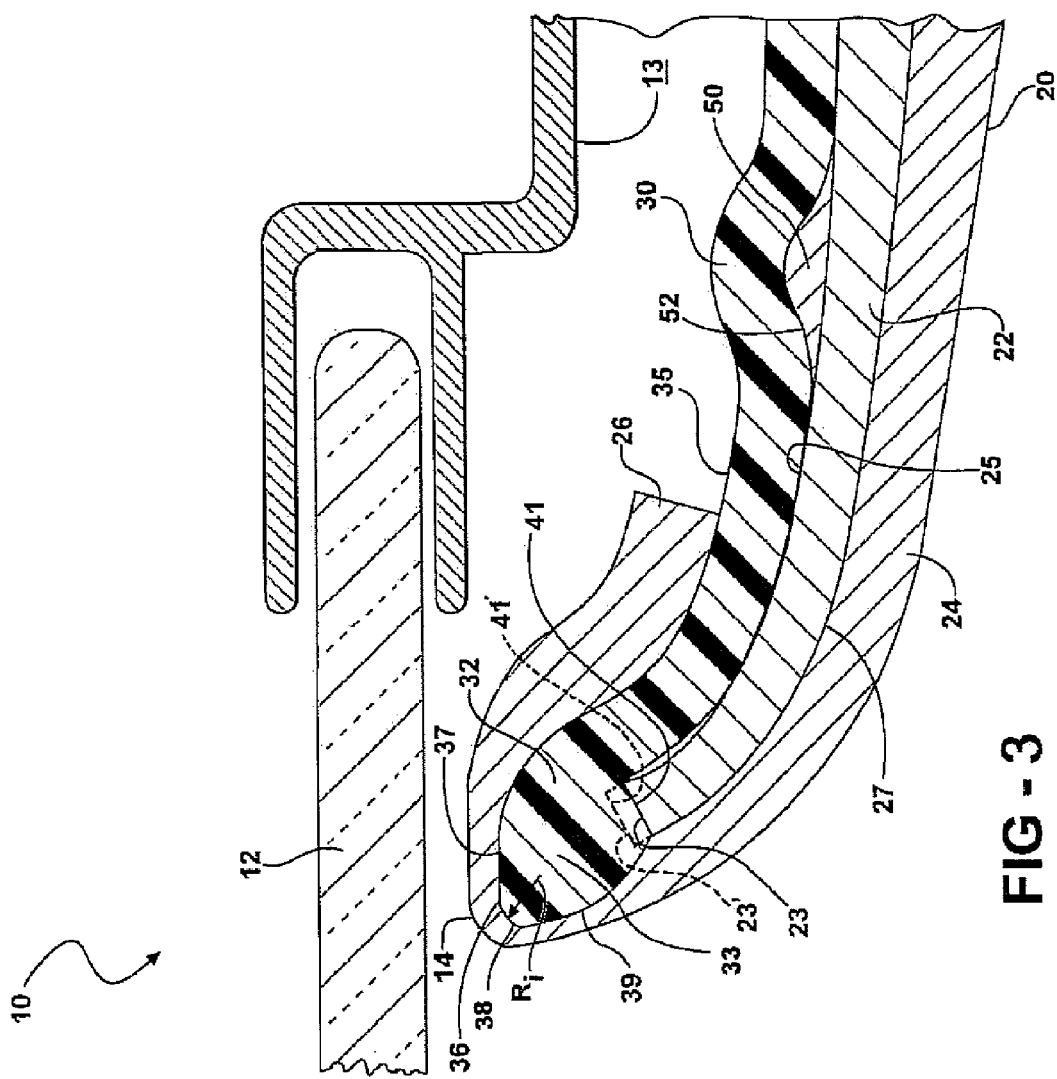
FIG. 3 is a cross sectional view of a second embodiment of the roof of the vehicle.

An undercut 41 is formed in the reinforcement 30 to receive the first edge 23 of the substrate 22. More specifically, the undercut 41 is formed adjacent to the bottom trailing surface 39 of the contoured portion 32. The undercut 41 receives the first edge 23 of the substrate 22 and provides for a smooth transition between the bottom surface 27 of the substrate 22 and the bottom trailing edge 39 of the contoured portion 32. Alternatively, as shown in FIG. 3, a recess 41' may be formed in the undercut 41 for receiving an extension or tab 23' extending from the first edge 23 of the substrate 22 to help retain the first edge 23 along the undercut 41.

A locating bump 50 extends from the upper surface 25 of the substrate 22. A recess 52 is formed in a bottom surface of the reinforcement 30 to receive the bump 50 and locate the reinforcement 30 relative to the substrate 22 during formation of the headliner assembly 10.

The invention has been described in an illustrative manner. It is, therefore, to be understood that the terminology used is intended to be in the nature of words of description rather than of limitation. Many modifications and variations of the invention are possible in light of the above teachings. For example, the reinforcement, substrate and trim cover may be coupled to each other using any fixing methods known by those having ordinary skill in the art, such as by adhesive bonding, insert molding, and the like. Thus, within the scope of the appended claims, the invention may be practiced other than as specifically described.

I claim:

1. A headliner assembly for covering an inner surface of a motor vehicle roof having a sunroof opening, said headliner assembly comprising:
   a dimensionally stable substrate having a first edge extending along the sunroof opening, the substrate having an upper surface facing the inner surface of the motor vehicle roof, the substrate further having a bottom surface opposite the upper surface, the first edge having an outwardly extending tab;
   a molded reinforcement fixedly secured to the upper surface of the substrate, the reinforcement having a second edge extending along the sunroof opening, the second edge of the reinforcement having a contoured portion having an outer surface with an arcuate cross section, the contoured portion extends further inwardly toward a center of the sunroof opening relative to the first edge of the substrate, the reinforcement includes an undercut adjacent the contoured portion and a recess, the recess receives the outwardly extending tab of the first edge to retain the first edge along the undercut to provide a smooth transition between the substrate and the contoured portion; and
   a trim cover having a third edge extending along the sunroof opening, the trim cover disposed along the bottom surface of the substrate and extending around the contoured portion of the reinforcement such that the third edge of the trim cover is disposed between the upper surface of the substrate and the inner surface of the motor vehicle roof.

2. The headliner assembly as set forth in claim 1, wherein contoured portion includes an upper trailing surface, a bottom trailing surface and a leading surface extending therebetween.

3. The headliner assembly as set forth in claim 2, wherein the upper trailing surface and the bottom trailing surfaces extend from opposite sides of the leading surface at a generally acute angle relative to each other.

4. The headliner assembly as set forth in claim 2, wherein the leading surface is arcuate and has a radius of approximately 3 mm.

5. The headliner assembly as set forth in claim 4, wherein the trim cover has a thickness of approximately 3 mm.

6. The headliner assembly as set forth in claim 2, wherein the undercut is adjacent the bottom trailing surface.

7. The headliner assembly as set forth in claim 1 including a bump extending outwardly from the substrate.

8. The headliner assembly as set forth in claim 7, wherein the reinforcement includes a recess that receives the bump and locates the reinforcement relative to the substrate during formation of the headliner assembly.

9. The headliner assembly as set forth in claim 8, wherein the third edge of the trim cover is fixedly secured to a top surface of the reinforcement and located between the contoured portion and the recess.

10. The headliner assembly as set forth in claim 9, wherein the trim cover is tensioned prior to fixedly securing the third edge to the top surface of the reinforcement so as to compress a portion of the trim cover and enhance the definition of the contoured portion as viewed through the trim cover.

11. The headliner assembly as set forth in claim 1, wherein the first edge is peripheral and extends along a perimeter of the sunroof opening.

12. The headliner assembly as set forth in claim 11, wherein the second edge is peripheral and extends along a perimeter of the sunroof opening.

13. A headliner assembly for covering an inner surface of a motor vehicle roof having a sunroof opening, said headliner assembly comprising:
   a dimensionally stable substrate having a first edge extending along the sunroof opening, the substrate having an upper surface facing the inner surface of the motor vehicle roof, the substrate further having a bottom surface opposite the upper surface, the substrate includes a bump extending outwardly from the upper surface of the substrate;
   a molded reinforcement having on upper surface and an opposite bottom surface, the bottom surface of the reinforcement being fixedly secured to the upper surface of the substrate, the reinforcement having a second edge extending along the sunroof opening, the second edge of the reinforcement having a contoured portion that extends further inwardly toward a center of the sunroof opening relative to the first edge of the substrate, the reinforcement includes a recess formed in the bottom surface of the reinforcement and wherein the recess receives the bump to locate the reinforcement relative to the substrate; and
   a trim cover having a third edge extending along the sunroof opening, the trim cover disposed along the bottom surface of the substrate and extending around the contoured portion of the reinforcement such that the third edge of the trim cover is disposed between the upper surface of the substrate and the inner surface of the motor vehicle roof.

14. The headliner assembly as set forth in claim 13, wherein contoured portion includes an upper trailing surface, a bottom trailing surface and a leading surface extending therebetween.

15. The headliner assembly as set forth in claim 14, wherein the upper trailing surface and the bottom trailing surfaces extend from opposite sides of the leading surface at a generally acute angle relative to each other.

16. The headliner assembly as set forth in claim 14, wherein the leading surface is arcuate and has a radius of approximately 3 mm.

* * * * *